(12) United States Patent
Brock et al.

(10) Patent No.: US 8,246,704 B2
(45) Date of Patent: Aug. 21, 2012

(54) CONTAINED VORTICIES DEVICE

(75) Inventors: John L. Brock, Auburn, MI (US);
Alexander Campbell Thompson, IV, Rochester Hills, MI (US)

(73) Assignee: Integradigm Corporation, Ft. Wayne, IN (US)

( * ) Notice: Subject to any disclaimer, the term of this patent is extended or adjusted under 35 U.S.C. 154(b) by 214 days.

(21) Appl. No.: 12/802,273

(22) Filed: Jun. 3, 2010

(65) Prior Publication Data
US 2011/0296808 A1    Dec. 8, 2011

(51) Int. Cl.
*B01D 45/12*    (2006.01)

(52) U.S. Cl. ............. 55/459.1; 55/447; 55/458; 55/424; 55/426; 55/428; 55/385.3; 95/267; 95/272; 96/383; 96/384; 96/385; 96/386

(58) Field of Classification Search ................. 55/459.1, 55/447, 458, 424, 426, 428, 429, 385.3; 95/267–272; 96/383–386
See application file for complete search history.

(56) References Cited

U.S. PATENT DOCUMENTS

| | | | | |
|---|---|---|---|---|
| 2,790,554 | A * | 4/1957 | Work | 210/294 |
| 3,219,420 | A * | 11/1965 | Dielenberg | 422/145 |
| 4,220,219 | A | 9/1980 | Flugger | |
| 4,350,510 | A * | 9/1982 | Hamada et al. | 55/349 |
| 6,385,967 | B1 | 5/2002 | Chen | |
| 6,810,557 | B2 * | 11/2004 | Hansen et al. | 15/353 |
| 7,380,639 | B2 | 6/2008 | Arlasky | |
| 7,490,467 | B2 | 2/2009 | Cummings | |
| 7,594,941 | B2 | 9/2009 | Zheng et al. | |
| 7,708,789 | B2 * | 5/2010 | Fester | 55/337 |
| 7,918,909 | B2 * | 4/2011 | McDowell | 55/337 |
| 8,025,123 | B2 | 9/2011 | Mabuchi | |
| 2003/0121722 | A1 | 7/2003 | Crombeen | |
| 2007/0266683 | A1 * | 11/2007 | McDowell | 55/429 |

FOREIGN PATENT DOCUMENTS

| | | |
|---|---|---|
| KR | 20000060178 A | 10/2000 |
| KR | 20020006867 A | 1/2002 |

* cited by examiner

*Primary Examiner* — Jason M Greene
*Assistant Examiner* — Dung H Bui
(74) *Attorney, Agent, or Firm* — Brooks Kushman P.C.

(57) ABSTRACT

A contained vortices device that allows for the flow of air or gas into and out of the device. In the process of gases moving through the device, a vortex is created within the device that allows for the separation of heavier materials, reduction of the size of any particulates, and the expelling of particulates of a significantly smaller size than was introduced to the device.

20 Claims, 9 Drawing Sheets

CONTAINED VORTICIES DEVICE

BACKGROUND OF THE INVENTION

The instant invention is a container device that allows for the flow of air or gas into and out of the device. In the process of gases moving through the device a vortex is created within the device that allows for the separation of heavier materials, reduction of the size of any particulates, and the expelling of particulates of a significantly smaller size than was introduced to the device.

Most prior art devices that induce a vortex within a chamber use a propeller or impellor to create the vortex. U.S. Pat. No. 7,380,639 issued to Arlasky on Jun. 3, 2008 is a prime example of the use of propellers.

THE INVENTION

The instant invention is a contained vortices device that comprises an enclosed cylindrical housing having a live end and a dead end, an inside side surface, a dead end inside surface, and a live end inside surface. The device is also comprised of an inlet, and outlet and a bullet shaped projection.

The instant invention will accept the flow of air or gas in, and will self-induce a vortex. The inlet pipe enters through a first opening from the side of the cylindrical housing and near the live end. The outlet pipe exits from a centered opening in the live end of the cylindrical housing. The bullet shaped projection is centered and attached to the inside surface of the dead end. The projection assists with the return vortex, reversing the incoming vortex and forcing the air or gas through the outlet. The area at the apex of the bullet creates an area of low pressure while the area around the bullet traps and recirculates the heavier material in a loop around the bullet until the particles are reduces to a finer particle size than those entering the housing, allowing for escape in the outgoing vortex and through the outlet.

The vortex is created by the ratio of the length of the inlet pipe from the inside side wall surface to the length of the outlet pipe from the inside live end surface at about 1:3 and wherein the ratio of the length of the bullet shaped projection from the inside surface of the dead end inside surface to the overall length of the enclosed cylindrical housing is about 1:3.

DETAILED DESCRIPTION OF THE DRAWINGS

Figure 1:
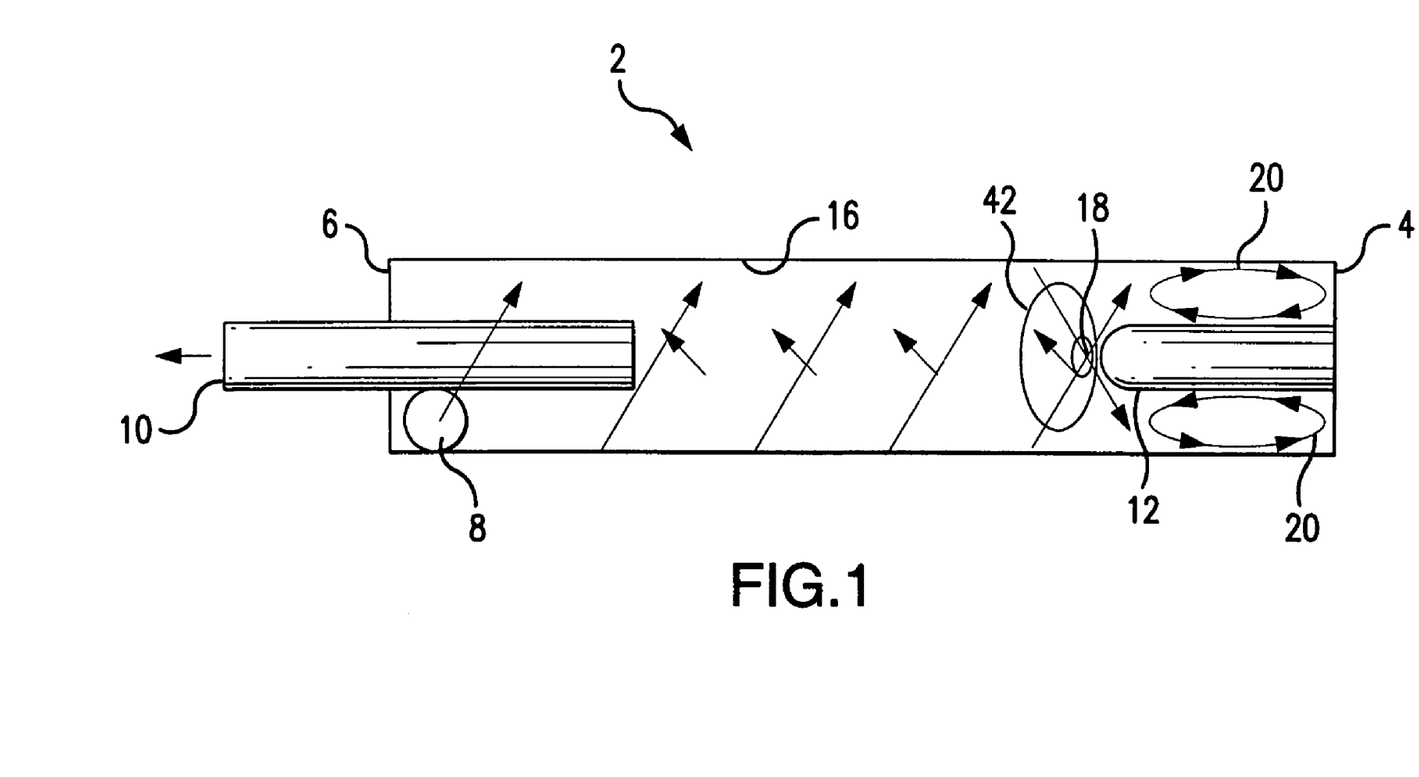
FIG. 1 is an internal view of the device.

FIG. 1 is an internal view of the device 2. By way of example, when the device 2 is attached to a vehicle exhaust system it allows the exhaust gas to flow in through the inlet 8 at the distal end 6. The gas flows into the device 2 and immediately begins to spin in a vortex flowing along the inside wall 16 until it reaches the projection or bullet 12. When the gas flowing in the vortex comes into contact with the projection 12 it creates a reverse venturi effect altering the course of the vortex in an upward manner directing the flow of the lighter gas toward the outlet 10 and out of the device 2. When the gas comes into contact with the projection 12 a low pressure area 18 develops just off the end of the projection 12. The gas is directed outward toward the inside wall 16 creating a torroidal vortex 42 forcing the gas to accelerate into the inside wall 16. The lighter particles move into the vortex that is expelling the gas and the heavier particles fall. Below this area and along the side of the bullet 12 a circulation is created that traps larger heavier particles and those particles remain entrained until they are reduce to a smaller particle size. This area is called the circulation loop 20. The particles here move up along the bullet where they are sent against the wall again. The particles will remain in this loop until they are small enough to move out. When the particles become small enough, i.e. light enough, to leave the circulation loop 20 they pass through the low pressure zone 18 and become captured in the vortex that removes the particles from the device 2.

The particles are reduced within the circulation loop 20 by being repeatedly driven into the inside walls 16 of the device 2. These repeated collisions have the ability to, over time, reduce particle size and then release them through the low pressure area 18 and into the vortex for expelling of the gas through the outlet 10.

Figure 2:
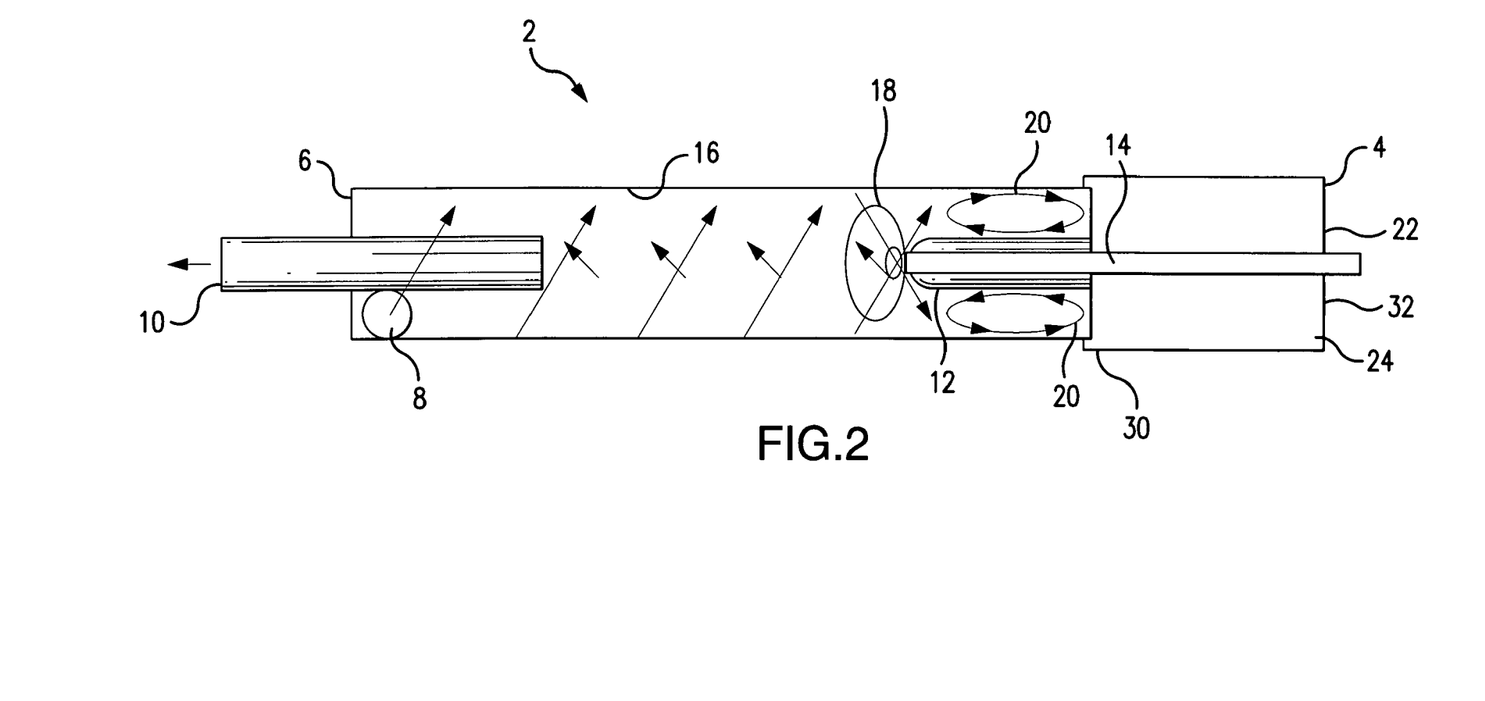
FIG. 2 is an internal view of the device as a muffler with a particle collector and an air flow opening through the bullet or projection.

FIG. 2 is an internal view of the device as a muffler with a particle collector 22 and an air flow opening 14 through the bullet or projection 12. The device 2 is attached to a vehicle exhaust allowing the exhaust gas to flow in through the inlet 8 at the distal end 6. The gas flows into the device 2 and immediately begins to spin in a vortex flowing along the inside wall 16 until it reaches the projection or bullet 12. When the gas flowing into the device 2 comes into contact with the projection 12 it creates a reverse venturi effect altering the course of the vortex in an upward manner directing the flow of the lighter gas toward the outlet 10 and out of the device 2. When the gas comes into contact with the projection 12, a low pressure area 18 develops just off the end of the projection 12. The gas is directed outward creating a torroidal vortex 42 forcing the gas to accelerate into the inside wall 16. The lighter particles move into the vortex that is expelling the gas and the heavier particles fall. Below this area and along side of the bullet 12 a circulation is created that traps larger heavier particles where those particles remain entrained until they are reduce to a smaller particle size. This area is called the circulation loop 20. The particles here move up along the bullet where they are sent against the wall again. The particles will remain in this loop until they are small enough to move out. When the particles become small enough to leave the circulation loop 20 they pass through the low pressure zone 18 and become captured into the vortex that removes the particles from the device 2.

This embodiment has an opening 14 that comes in through the near end 4 through the collector 22 and its near end 32 then continuing through the bullet 14. This opening 14 allows for the introduction of various materials into the low pressure zone 18 and into the vortex of the device 2. One example of a material that is introduced into the device would be cool air to reduce the heat that develops from the engine exhaust.

In addition, there can be a collector 22. The collector 22 serves the purpose of collecting particles that are large and remain in the circulation loop 20. These particles will eventually drop out into the collector 22 through openings 28 in the distal end 30 of the collector 22. In other embodiments the collector 22 is removable and acts as a filter. In other embodiments the collector 22 is baffled to create a resonating affect or is simply used as a resonator 24. It show also be noted that without the openings 28 the particles will remain in the circulation loop 20 until they have been reduced enough to pass through the low pressure zone 18 into the vortex and on to the outlet 10.

Figure 3:
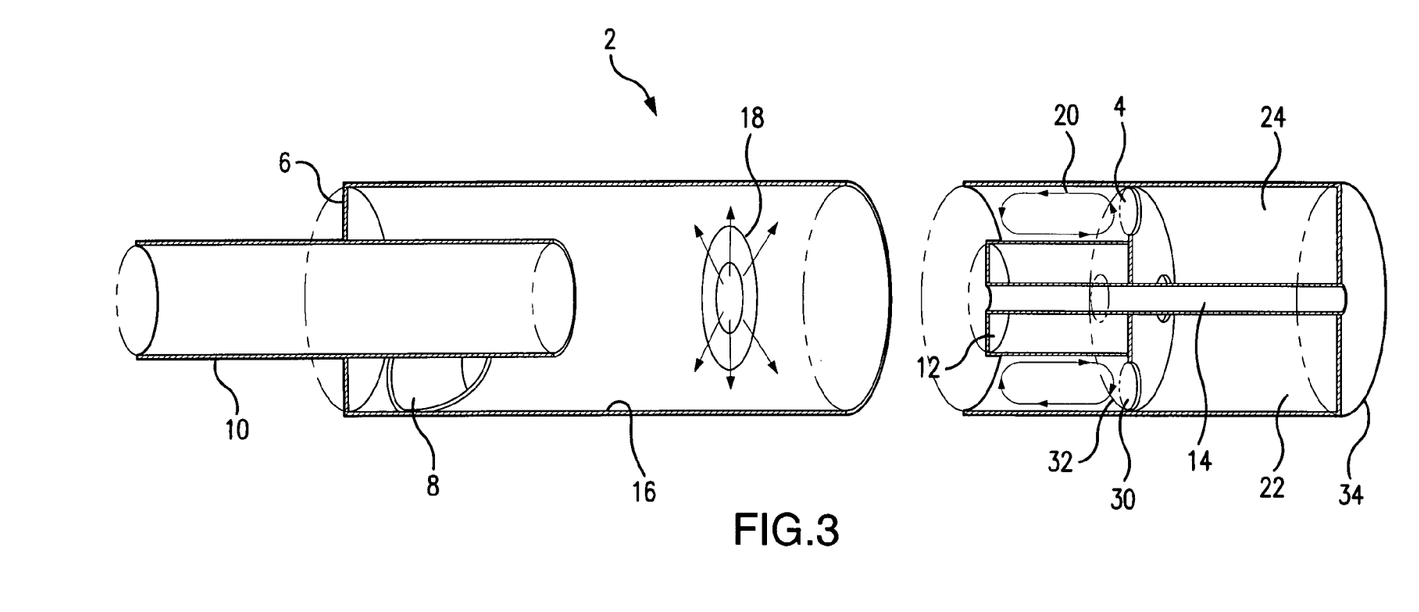
FIG. 3 is an internal view of the device as a muffler with a particle collector and an air flow opening through the bullet or projection.

FIG. 3 is an internal view of the device 2 as a muffler with a particle collector 22 and an air flow opening 14 through the bullet or projection 12. This view allows for a better look at the distal end 30 of the collector 22. The openings 28 in the collector 22 allow the larger heavy particles to drop or fall through into the collector 22.

Figure 4:
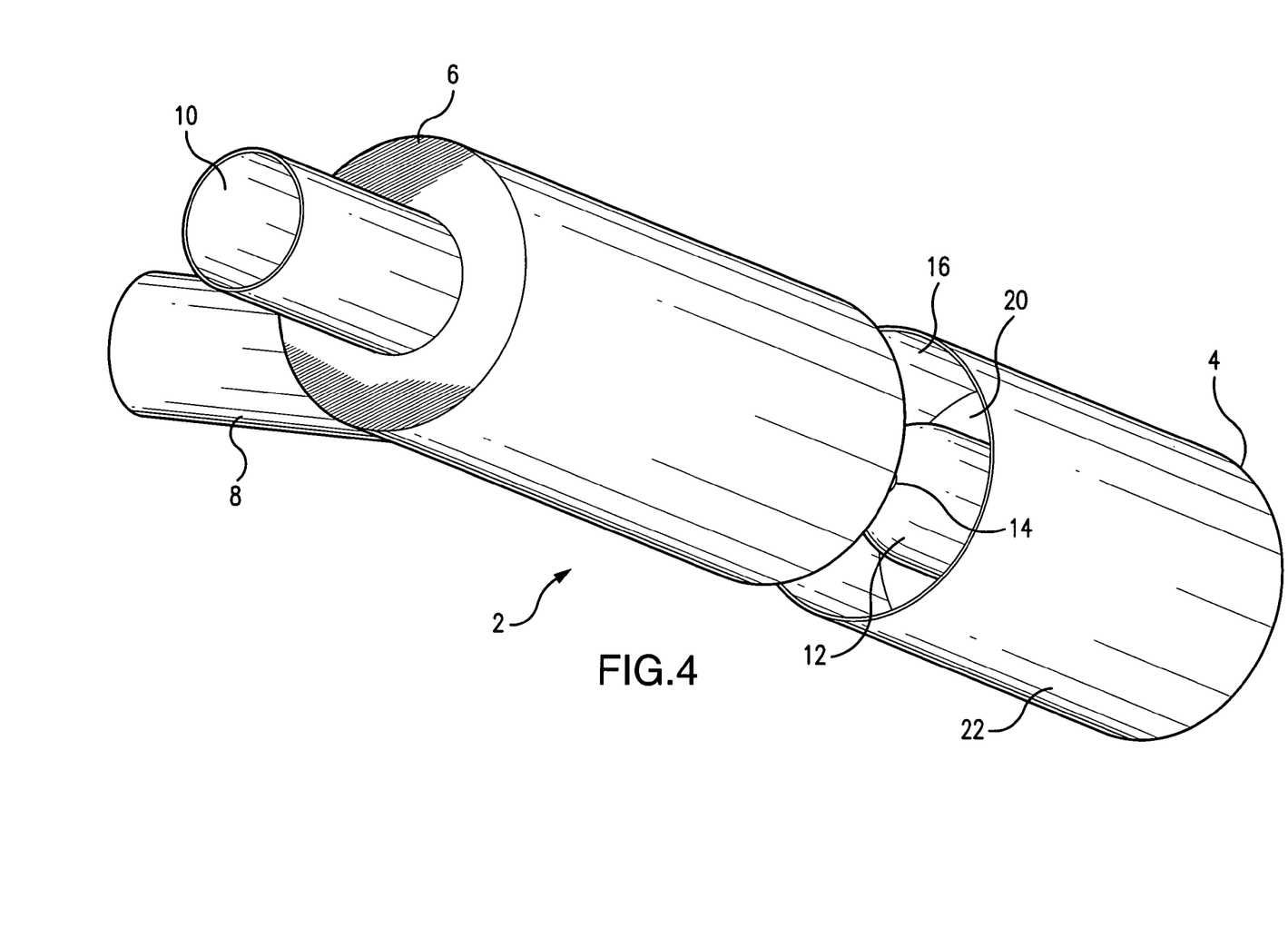
FIG. 4 is a segmental external view of the device as a muffler.

FIG. 4 is a segmental external view of the device 2 as a muffler. The inlet 8 and the outlet 10 both pass through the outside surface 34. Both are located near the distal end 6 of the device 2. The device 2 is totally self contained with all operations internal to the device 2. The end of the bullet 12 and the opening 14 through it are also visible. This view allows for a better understanding of the area around the bullet 12. This area surrounding the bullet is where the circulation loop 20 exists. The heavier particles become trapped and entrained here. They will recirculate here until they have been reduced or fall into the collector 22.

Figure 5:
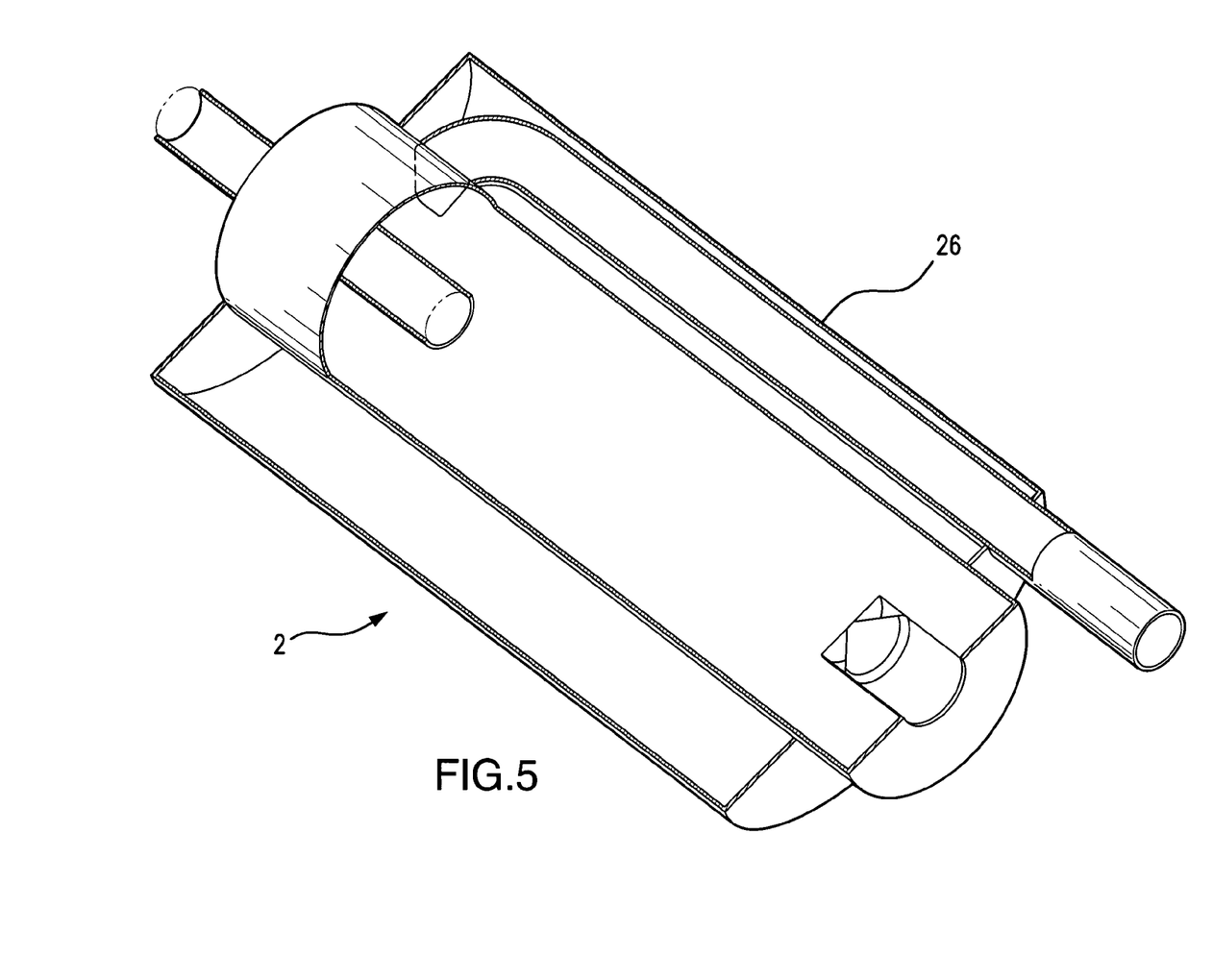
FIG. 5 is an internal view of another muffler embodiment.

FIG. 5 is an internal view of another muffler embodiment. In this embodiment the device 2 is surrounded by an outer housing 26. This outer housing can be for aesthetic value or incorporated as a larger resonator cavity.

Figure 6:
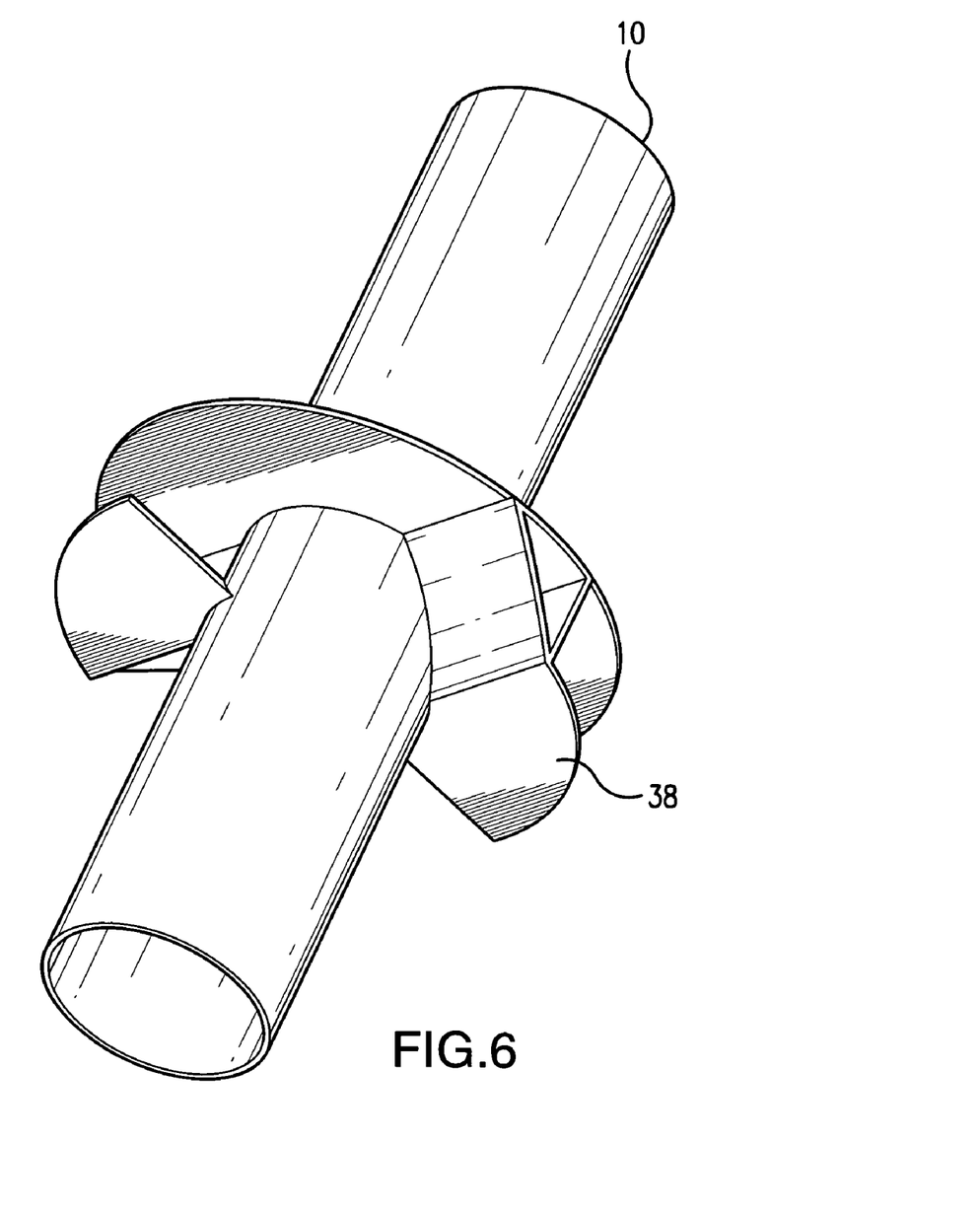
FIG. 6 is another embodiment of the outlet featuring a deflector for the inlet.

FIG. 6 is another embodiment of the outlet 10 featuring a deflector 38 for the inlet 8. This embodiment induces a vortex faster within the device 2. This deflector is not necessary to create the vortex but will initiate it faster. The deflector 38 is attached to the outlet 10 adjacent to the inlet 8. The incoming gas will hit the deflector and immediately spin into a vortex.

Figure 7:
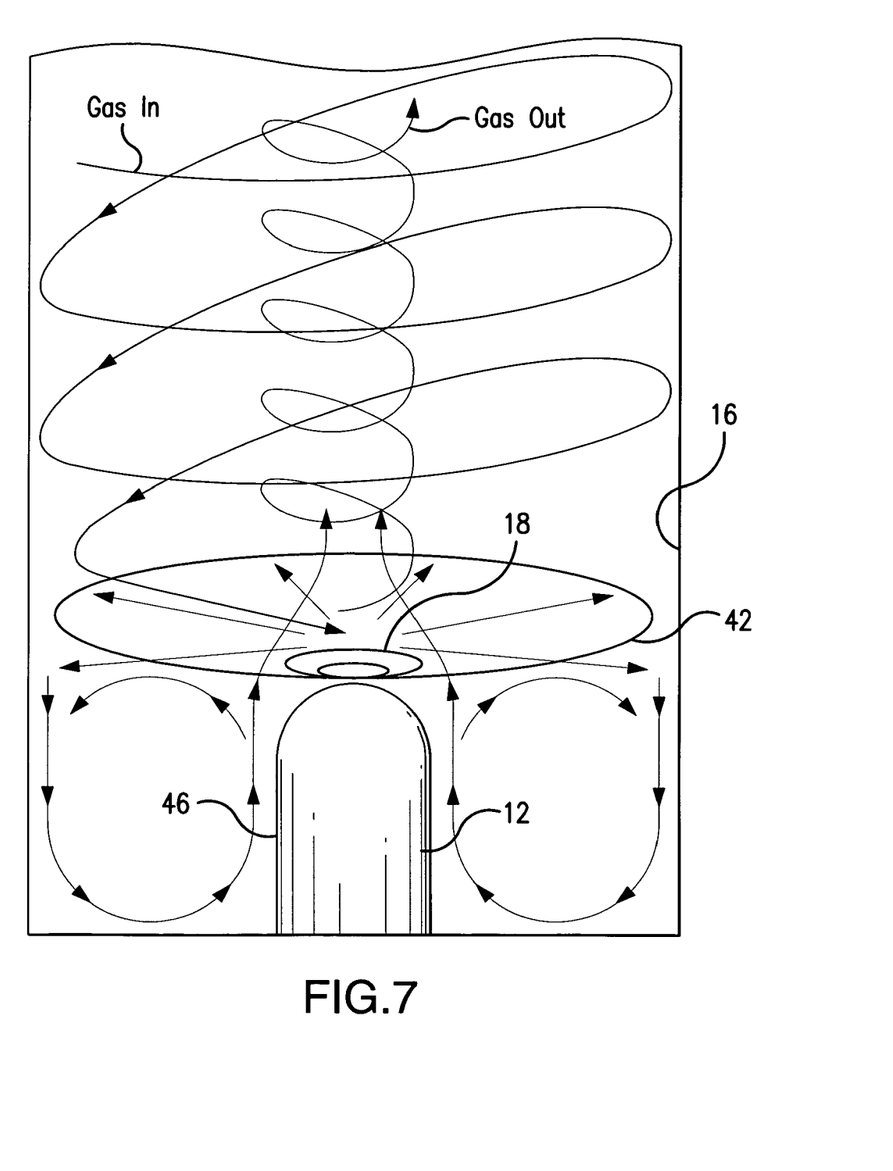
FIG. 7 is a gas flow diagram.

FIG. 7 is a gas flow diagram. The exhaust comes in and circulates down around the inside wall 16. When it reaches the tip of the bullet 12 a low pressure area 18 is created. The lighter particles move up the vortex and the heavier particles are forced out by the torroidal vortex 42. These heavier particles hit the inside wall 16 reducing their size. The heavier particles become entrained in the circulation loop 20 and move down along the inside wall 16 and along the bottom and then up the outside wall 46 of the bullet 12 to be reintroduced into the torroidal vortex 42 or as smaller particles they leave. The particles that are too large remain in the loop 20 until they are reduced in size enough to pass through the low pressure zone 18 and out of the device 2.

Figure 8:
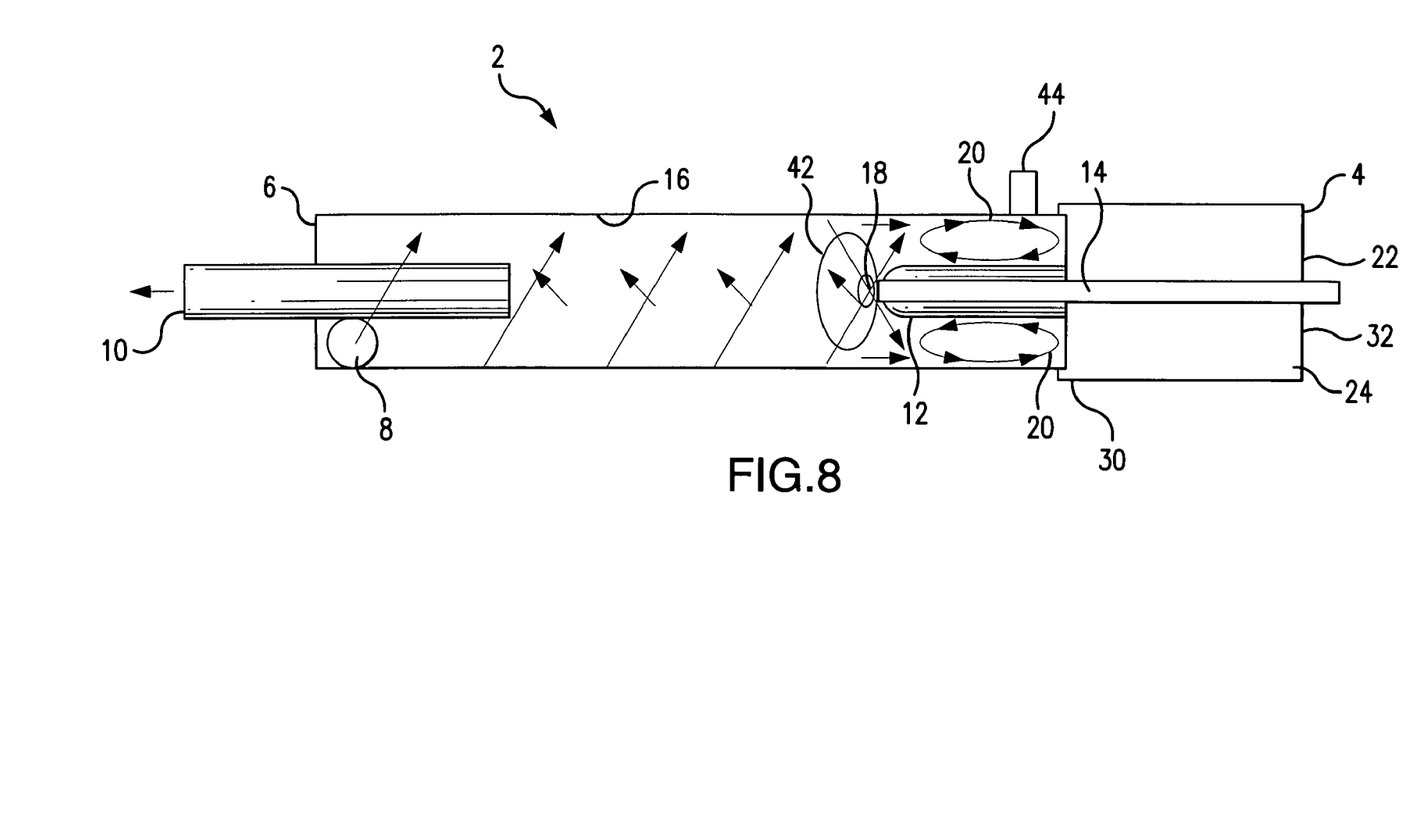
FIG. 8 is another embodiment of the device featuring a recovery outlet to recycle unused fuel.

FIG. 8 is another embodiment of the device 2 featuring a recovery outlet 44 to recycle unused fuel or hydrocarbon. This embodiment is ideal for use as a muffler for a diesel motor because it has a recirculation loop 40. The heavier particles that are within the circulation loop 20 are drawn off and reintroduced into the combustion cycle to be reburnt. This will improve emissions and increase mileage.

Figure 9:
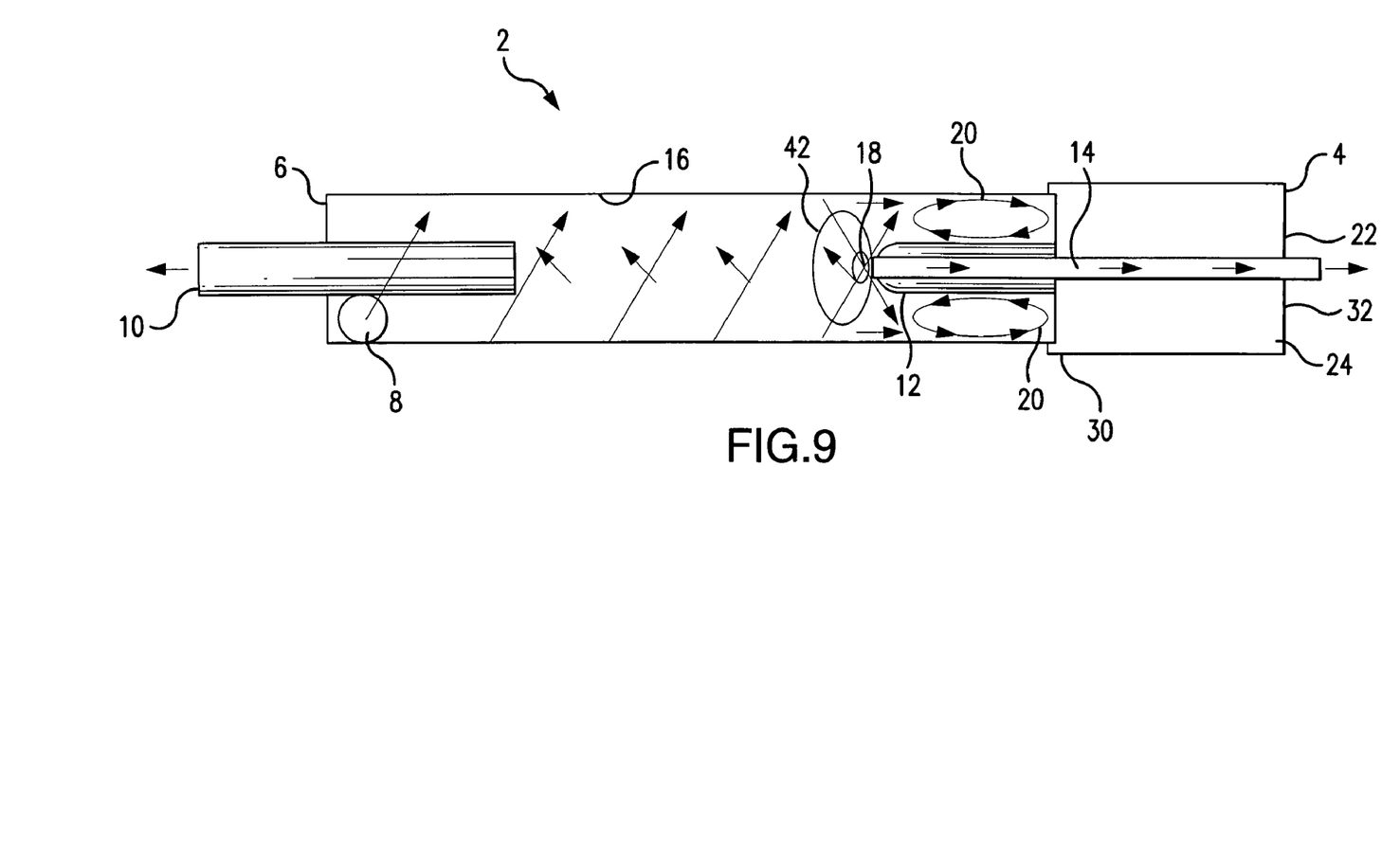
FIG. 9 is another embodiment of the device featuring a recovery outlet to recycle unused fuel.

FIG. 9 is another embodiment of the device featuring a recovery outlet 44 to recycle unused fuel. In this embodiment the recovery outlet is the opening 14 in the projection 12. The heavier particles are drawn off through the opening 14 in the bullet 12 and reintroduced into the combustion cycle.

The device is also capable of being used in other applications with any motor or process that creates an exhaust. The device is used in a coal fired power generation process when attached to the exhaust created by the process and the gas will flow into the inlet 8 of the distal end 6 allowing the exhaust gas to flow in through the inlet 8 at the distal end 6. The gas flows into the device 2 and immediately begins to spin in a vortex flowing along the inside wall 16 until it reaches the projection or bullet 12. When the gas flowing into the device 2 comes into contact with the projection 12 it creates a reverse venturi effect altering the course of the vortex in an upward manner directing the flow of the lighter gas toward the outlet 10 and out of the device 2. When the gas comes into contact with the projection 12 a low pressure area 18 develops just off the end of the projection 12. The gas is directed outward creating a torridal vortex forcing the gas to accelerate into the inside wall 16. The lighter particles move into the vortex that is expelling the gas and the heavier particles fall. Below this area and along side of the bullet 12 a circulation is created that traps larger heavier particles where those particles remain entrained until they are reduce to a smaller particle size. This area is called the circulation loop 20. The particles here move up along the bullet where they are sent against the wall again. The particles will remain in this loop until they are small enough to move out. When the particles become small enough to leave the circulation loop 20 they pass through the low pressure zone 18 and become captured into the vortex that removes the particles from the device 2. The exhaust is therefore cleaned as heavier particles are either reduced or removed in the manner explained previously. The device 2 is also adapted to be used in the incineration process. When the device is attached to the exhaust of an incinerator the exhaust will flow in through the inlet 8 at the distal end 6. The gas flows into the device 2 and immediately begins to spin in a vortex flowing along the inside wall 16 until it reaches the projection or bullet 12. When the gas flowing into the device 2 comes into contact with the projection 12 it creates a reverse venturi effect altering the course of the vortex in an upward manner directing the flow of the lighter gas toward the outlet 10 and out of the device 2. When the gas comes into contact with the projection 12 a low pressure area 18 develops just off the end of the projection 12. The gas is directed outward creating a torridal vortex forcing the gas to accelerate into the inside wall 16. The lighter particles move into the vortex that is expelling the gas and the heavier particles fall. Below this area and along side of the bullet 12 a circulation is created that traps larger heavier particles where those particles remain entrained until they are reduce to a smaller particle size. This area is called the circulation loop 20. The particles here move up along the bullet where they are sent against the wall again. The particles will remain in this loop until they are small enough to move out. When the particles become small enough to leave the circulation loop 20 they pass through the low pressure zone 18 and become captured into the vortex that removes the particles from the device 2. The exhaust is therefore cleaned as heavier particles are either reduced or removed in the manner explained previously. That is to say collected, reduced or recirculated reducing or eliminating emissions. This is especially crucial in the incineration of hazardous waste.

There is a relationship that allows for the development of the vortex within the device 2. The inlet pipe enters through a first opening from the side of the cylindrical housing and near the live end. The outlet pipe exits from a centered opening in the live end of the cylindrical housing. The bullet shaped projection is centered and attached to the inside surface of the dead end. The vortex is created by the ratio of the length of the inlet pipe from the inside side wall surface to the length of the outlet pipe from the inside live end surface is about 1:3 and wherein the ratio of the length of the bullet shaped projection from the inside surface of the dead end inside surface to the overall length of the enclosed cylindrical housing is about 1:3.

What is claimed is:

1. A contained vortices device comprising:
   a. an enclosed cylindrical housing having a live end and a dead end, an inside side surface, a dead end inside surface, and a live end inside surface;
   b. an inlet pipe;
   c. an outlet pipe, and,
   d. a bullet shaped projection;
   said inlet pipe entering through a first opening from the side of the cylindrical housing;
   said outlet pipe exiting from a centered opening in the live end of the cylindrical housing;
   said bullet shaped projection being centered and attached to the inside surface of the dead end; and
   wherein the first opening is defined in the side of the housing between the inside live en surface and an end of the outlet pipe and wherein the bullet shaped projection extends from the inside surface of the dead end inside surface toward the live end.

2. A device as claimed in claim 1 wherein, said device is a muffler.

3. A device as claimed in claim 1 wherein, said device is a particle separator.

4. A device as claimed in claim 1 wherein, said device is a mixer.

5. A device as claimed in claim 1 further comprising a deflector mounted near the outlet of said inlet.

6. A device as claimed in claim 1 wherein, said bullet shaped projection is hollow.

7. A device as claimed in claim 1 further comprising a collection area mounted adjacent said bullet shaped projection.

8. A device as claimed in claim 1 further comprising a means for cool air injection through the bullet shaped projection for cooling exhaust gas.

9. A device as claimed in claim 1 further comprising a resonator chamber housing the device.

10. A device as claimed in claim 1 further comprising an outer chamber housing the device.

11. A device as claimed in claim 1 further comprising a circulation loop provided to recycle hydrocarbons into a combustion chamber.

12. A device as claimed in claim 1 further comprising a circulation loop provided to recycle particles into a combustion chamber.

13. In combination, a device as claimed in claim 1 and combustion processing equipment.

14. In combination, a device as claimed in claim 1 and a coal fired power generating furnace to filter emissions from the coal fired power generating furnace.

15. In combination, a device as claimed in claim 1 and an incinerator to filter hazardous material from the incinerator.

16. In combination, a device as claimed in claim 1 and a combustion chamber.

17. A method of controlling exhaust gas, the method comprising configuring in combination a device as claimed in claim 1 with an exhaust source and allowing any exhaust gas from the exhaust source to flow through said device.

18. A method of treating exhaust gas, said method comprising configuring in combination a device as claimed in claim 1 with a circulation loop that conveys the exhaust gas from the device to a combustion chamber, wherein said conveyed exhaust gas is combusted.

19. A method of filtering emissions from a coal fired power generating furnace, said method comprising configuring in combination a device of claim 1 and a coal fired power generating furnace such that said emissions from the coal fired power generating furnace are passed through the device.

20. A method of filtering hazardous material from an incinerator, said method comprising configuring in combination a device of claim 1 and an incinerator such that hazardous materials from the incinerator are passed through the device.

* * * * *